United States Patent [19]
Koda et al.

[11] Patent Number: 5,635,226
[45] Date of Patent: Jun. 3, 1997

[54] COMPOSITE MOLDING DEVICE FOR STRETCH BLOW MOLDING

[75] Inventors: Hideaki Koda, Ueda; Hisashi Nakajima, Sakakimachi; Hisao Yamaguchi, Komoro, all of Japan

[73] Assignee: A.K. Technical Laboratory Inc., Japan

[21] Appl. No.: 531,736

[22] Filed: Sep. 21, 1995

[30] Foreign Application Priority Data

Sep. 26, 1994 [JP] Japan ................................ 6-256216
Feb. 28, 1995 [JP] Japan ................................ 7-065031

[51] Int. Cl.$^6$ ................................ B29C 49/06; B29C 49/56
[52] U.S. Cl. ........................ 425/529; 425/533; 425/541
[58] Field of Search ............................... 425/538, 541, 425/530, 528, 529, 526, 535, 533

[56] References Cited

U.S. PATENT DOCUMENTS

| | | | |
|---|---|---|---|
| 2,872,700 | 2/1959 | Knowles | 425/541 |
| 2,913,762 | 11/1959 | Knowles | 425/541 |
| 3,002,225 | 10/1961 | Goller | 425/538 |
| 3,063,092 | 11/1962 | Fischer | 425/538 |
| 3,069,722 | 12/1962 | Kato | 425/541 |
| 3,441,982 | 5/1969 | Sagara et al. | 425/541 |
| 4,233,009 | 11/1980 | Hagen | 425/531 |
| 4,648,824 | 3/1987 | Aoki | 425/529 |
| 4,726,756 | 2/1988 | Aoki | 425/526 |
| 4,741,688 | 5/1988 | Aoki | 425/526 |

FOREIGN PATENT DOCUMENTS 1565593  5/1969  France ................................ 425/538

*Primary Examiner*—Robert Davis
*Attorney, Agent, or Firm*—Ostrolenk, Faber, Gerb & Soffen, LLP

[57] ABSTRACT

A composite molding device is provided at the same site for preforming a closed-end parison or controlling the temperature of the closed-end parison as well as stretch blow molding the preform or temperature-controlled parison to a final product, such as a bottle. The composite molding device applied for stretch blow molding includes a clamping device, a pair of first mold halves, and a pair of second mold halves. The pair of second mold halves are removably placed between the pair of first mold halves in the clamping device so as to use the clamping device as a common clamping device.

7 Claims, 9 Drawing Sheets

COMPOSITE MOLDING DEVICE FOR STRETCH BLOW MOLDING

BACKGROUND OF THE INVENTION

1. Field of the Invention

The present invention relates to a composite molding device applicable at the same site for preforming a closed-end parison or controlling the temperature of the closed-end parison as well as stretch blow molding the preform or temperature-controlled parison to a final product, such as a bottle.

2. Background Art

Two different methods are applicable to the process of injection and stretch blow molding, which releases an injection-molded, closed-end parison from an injection mold immediately after conclusion of injection molding and manufactures a hollow article, such as a vessel, by stretch blowing the still warm closed-end parison. One method manufactures a final product by the process of stretch blow molding (may be referred to as primary blow molding) after molding the parison released from the injection mold to a preform corresponding to an intermediate or controlling the temperature of the parison. The other method directly prepares a final product from the parison by the process of stretch blow molding.

The injection-molded parison is placed into either a preform mold or a temperature control mold, which is interposed between an injection mold and a blow mold, for preforming or temperature control of the parison prior to the primary blow molding. The temperature control may be implemented through the preforming process.

The injection and stretch blow molding process having either the preforming step or the temperature control step requires four stations; that is, an injection-molding station, a preforming or temperature-control station, a primary blow molding station, and a product release station. Each station requires a set of neck mold in order to realize the simultaneous operations at the respective stations; that is, a total of four sets of neck mold also functioning as transport members of the parison or the final product are required.

Such a 4-station molding device including a preforming or temperature-control station is greater in size than a 3-station molding device for directly stretch blow molding an injection-molded parison to a final product, and requires one additional set of neck mold. In a structure adopting a rotary table as transport means, a problem of inertia arises in the course of rotating shift due to the increased diameter and weight of the bulky device.

A temperature-controlling, blow molding device has been developed in order to solve this problem, where temperature control of a parison and stretch blowing are executed at an identical site (see Japanese Patent Laid-Open Publication No. 60-247541). The device includes a pair of clamping plates mounted on a slidable seat member arranged on a table, and separate temperature-control mold half and blow mold half disposed in parallel inside the pair of clamping plates. A lateral or horizontal shift of the seat member alternately moves the temperature control mold and the blow mold with the pair of clamping plates with respect to a parison supported by a neck mold, so as to implement the temperature control process and the stretch blowing process without moving the parison.

A molding machine having the conventional temperature controlling, blow molding device requires three operation stations with three sets of neck mold. Since the temperature control mold and the blow mold are arranged in parallel inside the same pair of clamping plates, the width of the clamping plates in this molding machine is substantially twice the width of clamping plates on a 4-station device. Even when the width of the clamping plates on the 3-station machine is within a table dimension, leftward and rightward lateral shifts during the molding process require the blow molding device on the table to have a sufficiently large area allowing the lateral shifts.

Lateral shifts of clamping plates do not require a much additional area in a small-sized molding machine applied for simultaneously manufacturing a less number of small articles. A mass-producing, molding machine applied for simultaneously producing a large number of articles or a large-sized molding machine applied for manufacturing bulky articles like 20 1-bottles has clamping plates of a remarkably greater width than those applied for the small production, and it is extremely difficult to set the sufficient area allowing lateral shifts on the table because of the preferable orientation of operation stations.

This structure shifts an extremely large mass, that is, a clamping device as well as the clamping plates and the molds on the seat member, and accordingly requires a powerful shifting device. This structure is thus applicable only to small-sized molding machines and is not suitable for stretch blow molding devices used for the purpose of mass production or production of large articles.

SUMMARY OF THE INVENTION

One object of the present invention is thus to dispose a preform mold and a primary blow mold, which are essential for preforming a parison to an intermediate form and for stretch blow molding the intermediate form to a hollow final product, such as a bottle, in such a manner that one of the preform mold and the primary blow mold is movably interposed between halves of the other mold along a parting line.

Another object of the invention is to provide a composite molding device applied for stretch blow molding and having a novel structure to allow mass production of desired hollow articles, such as bottles, without substantially increasing a required area of a table.

Still another object of the present invention is to provide a composite molding device applied for stretch blow molding and having a novel structure, where a single clamping device securely fixed to a table is used in common for a preform mold and a primary blow mold, so that the clamping force uniformly acts on a large-sized, multi-cavity mold to prevent the mold from undesirably opening by the blow pressure.

The above and the other related objects are realized by a composite molding device applied for stretch blow molding, which includes:

a clamping device being provided with a pair of stationary platens, a pair of clamping cylinders, and a pair of movable platens, the pair of stationary platens interconnected by a plurality of tie bars and arranged upright and in parallel on a base plate, the pair of clamping cylinders disposed outside the pair of stationary platens for receiving a pair of clamping pistons, respective ends of the clamping pistons running through and being projected inward from the corresponding stationary platens, the pair of movable platens arranged between the pair of stationary platens and supported by the tie bars to be movable in a predetermined direction, the movable platens being linked with the respective ends of the clamping pistons;

a pair of first mold halves respectively attached to opposed faces of the movable platens in the clamping device to be movable in the predetermined direction between a mold-opening position and a mold-closing position; and a pair of second mold halves arranged to move between an advance position, where the pair of second mold halves are placed between the pair of first mold halves in the clamping device, and a retreat position, the pair of second mold halves being pressed against and supported by movable members of an air or hydraulic reciprocating unit to have a parting line identical with a parting line of the pair of first mold halves in the clamping device, the pair of second mold halves being normally pressed to a mold-opening position, when the pair of second mold halves being placed between the pair of first mold halves arranged at the mold-opening position in the clamping device, pressure of the clamping device being transmitted via the pair of first mold halves to the pair of second mold halves so as to close and clamp the pair of second mold halves.

According to one preferable application, one pair out of the pair of first mold halves and the pair of second mold halves includes halves of preform mold having mating faces to confront to shape of a first cavity applied for molding a parison to a preform or controlling temperature of the parison, whereas the other pair includes a bottom mold and halves of primary blow mold having mating faces to confront to shape of a second cavity applied for molding the preform to a final product. The preform mold may include, according to the requirements, heating means disposed inside the halves of preform mold, and thermal insulating means at a predetermined position coming into contact with the halves of primary blow mold. The halves of preform mold are combined to define a first recess on an upper end of the first cavity for receiving a neck mold, which functions as a parison holder and is arranged below a horizontally and vertically movable transfer platen positioned above the clamping device, so as to allow horizontal movement of the neck mold between an opening position and a closing position. The halves of primary blow mold are also combined to define a second recess on an upper end of the second cavity, where the second recess has a cross section identical with that of the first recess.

The reciprocating unit for moving the pair of second mold halves preferably includes:

a reciprocating cylinder vertically secured within the base plate and immediately below the mold-closing position of the pair of first mold halves in the clamping device, the reciprocating cylinder receiving a reciprocating piston;

an elevating table linked with a top end of the reciprocating piston, the pair of second mold halves being mounted on the elevating table to be movable in the predetermined direction, in which the pair of movable platens move; and an elevating mechanism for vertically moving the pair of second mold halves mounted on the elevating table to be moveable between a mold-opening position and a mold-closing position.

In this structure, the cylinder is fixed to a bottom member of a recess formed in the base plate, and the elevating mechanism moves the pair of second mold halves with the elevating table arranged on the top end of the piston to lift up and down the pair of second mold halves in the recess.

According to another preferable structure, the reciprocating unit functions as means for laterally moving the pair of second mold halves between an advance position, where the pair of second mold halves are interposed between the pair of first mold halves in the clamping device, and a retreat position. The reciprocating unit includes:

a base arranged just beside the mold-closing position of the pair of first mold halves in the clamping device;

a movable member mounted on the base to approach to and separate from the pair of first mold halves in the clamping device; and a pair of support plates movably supported by both ends of a support shaft spanning across one end of the movable member and normally pressed outward by a spring member, the pair of second mold halves being attached respectively inside the pair of support plates.

This structure allows the pair of second mold halves at the mold-opening position to horizontally move between an advance position, where the pair of second mold halves are interposed between the pair of first mold halves in the clamping device, and a retreat position.

The pair of first mold halves and the pair of second mold halves are attached to either in the clamping device or in the reciprocating unit. In one structure, a preform mold is disposed in the clamping device, while a primary blow mold is mounted on the reciprocating unit. In an alternative structure, a primary blow mold is disposed in the clamping device, while a preform mold is mounted on the reciprocating unit. In either structure, the preform mold is used prior to the primary blow mold in the molding process.

In the structure of the invention including the two pairs of mold halves disposed at the same site, only the pair of second mold halves are moved for replacing the pair of first mold halves. Compared with the conventional structure of alternately moving first mold halves and second mold halves with a clamping device with respect to a parison for replacement, the structure of the invention reduces a required area of base plate, thereby preventing a molding machine requiring the preforming or temperature control process from becoming undesirably bulky.

Like known molding machines, the clamping device is secured to the base plate, while the first mold halves are replaced by the second mold halves in the clamping device. Compared with the conventional structure of horizontally moving the clamping device for replacement, this structure of the invention is free from danger and shifts a smaller mass corresponding to only the pair of second mold halves for replacing the pair of first mold halves.

In the structure of lifting up and down the pair of second mold halves, even when a long side-to-side, multi-cavity mold is used for mass production, the multi-cavity mold is shifted in the vertical direction not to increase the moving distance proportional to its length. This structure decreases the moving distance of the multi-cavity mold in the horizontal direction, thereby saving the time required for the replacement. A relatively small-sized elevating mechanism sufficiently works for replacing one mold by another.

In the structure of the invention, the pair of second mold halves are pressed and closed via the pair of first mold halves in the clamping device. The clamping device on the base plate is thus used in common for closing and clamping both the first mold halves and the second mold halves. A pressing force is applied to the substantial center of each mold half in order to close and clamp the mold halves. The closing and clamping force uniformly acts even on a large-sized mold applied for simultaneously producing a large number of products, thereby preventing the mold from being undesirably opened by the blow pressure.

These and other objects, features, aspects, and advantages of the present invention will become more apparent from the following detailed description of the preferred embodiments with the accompanying drawings.

DETAILED DESCRIPTION OF THE PREFERRED EMBODIMENTS

Figure 1:
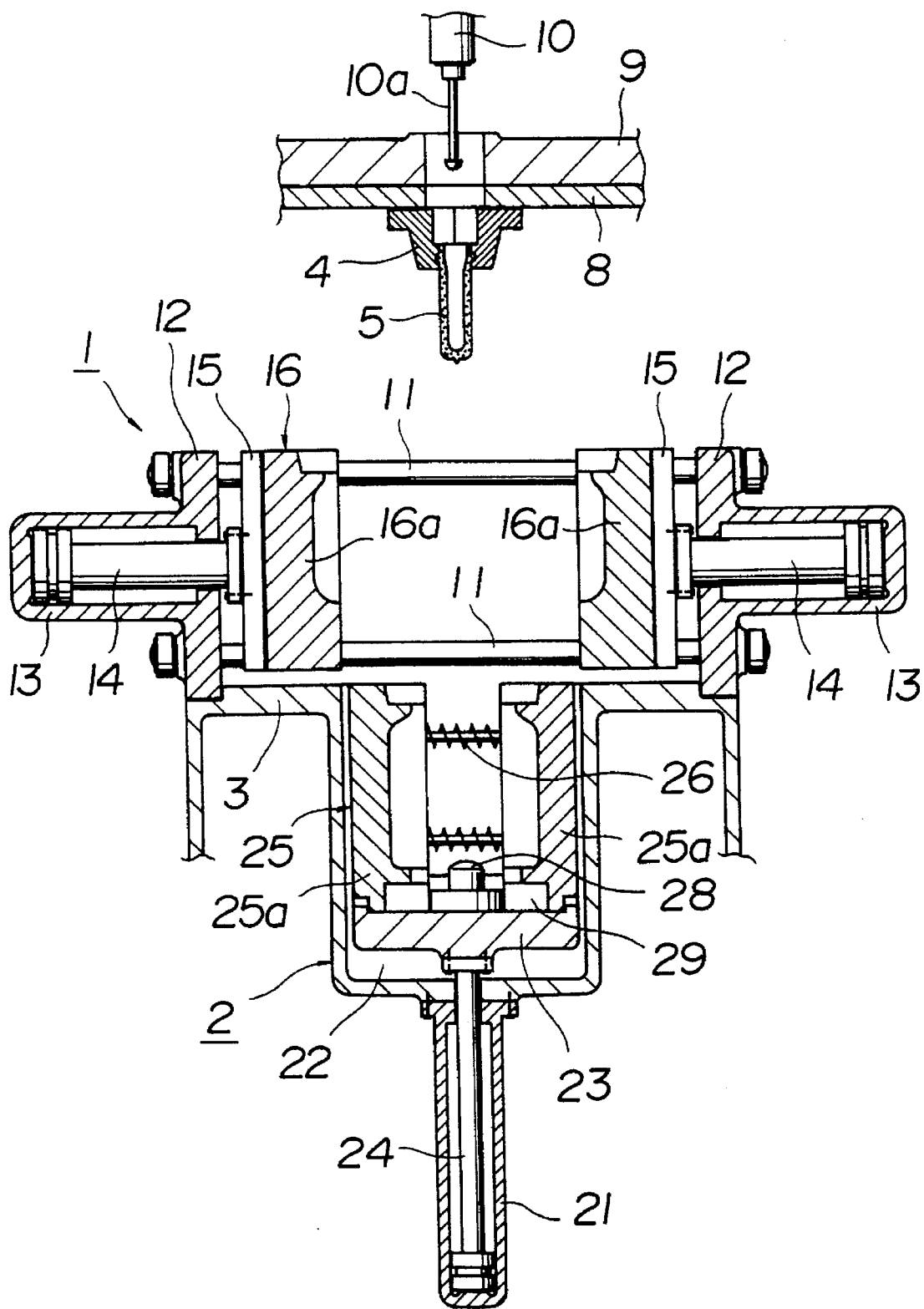
FIG. 1 is a vertical cross sectional view illustrating a composite molding device, in an open state, for stretch blow molding, as a first embodiment according to the present invention.
Figure 2:
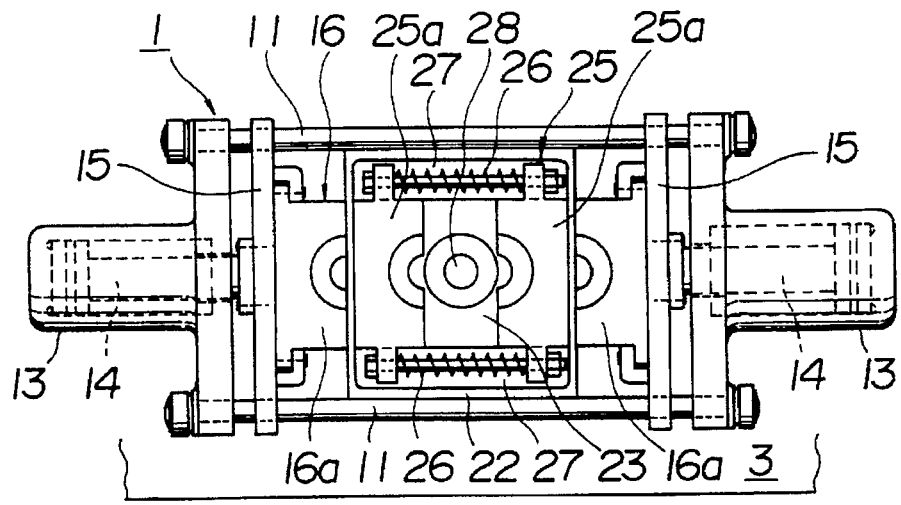
FIG. 2 is a plan view illustrating the composite molding device of the first embodiment.

FIGS. 1 through 6 show a composite molding device as a first embodiment according to the invention, where a preform mold and a primary blow mold are arranged in three dimensions and a common clamping device 1 is applied to both the preform mold and the primary blow mold.

The clamping device 1 includes a pair of stationary platens 12,12 interconnected at four corners by tie bars 11,11 and arranged upright and in parallel on a base plate 3. The pair of stationary platens 12,12 are secured horizontally at a stop position of a neck mold 4 on the base plate 3. A pair of hydraulic clamping cylinders 13,13 are integrally formed outside the stationary platens 12,12. Respective ends of clamping pistons 14,14 of the clamping cylinders 13,13 run through the corresponding stationary platens 12,12 and are projected inside the stationary platens 12,12.

A pair of movable platens 15,15 are arranged between the pair of stationary platens 12,12 and supported by the piercing tie bars 11,11 to be freely movable in the horizontal direction. The movable platens 15,15 are linked with the respective ends of the clamping pistons 14,14 via intermediate members.

Mold halves 16a,16a of a preform mold 16 are attached to the opposed faces of the movable platens 15,15 and closed to define a recess on the upper portion thereof for receiving the neck mold 4. Parting or mating faces of the preform mold halves 16a,16a conform to the shape of a cavity used for expanding a closed-end parison 5 supported by the neck mold 4 to a preform 6. Expansion and contraction of the clamping pistons 14,14 advance and retreat the movable platens 15,15 via the tie bars 11,11 functioning as a guide, so as to close and open the preform mold 16. The mating faces of the preform mold halves 16a,16a are combined to define, on their upper ends, a recess for receiving the neck mold 4.

The preform mold halves 16a, 16a further include a flow path for the purpose of temperature control, although not shown in the drawings. A heat medium flows through the flow path to implement both the preforming and temperature control processes according to requirements.

An elevating mechanism 2 disposed inside the base plate 3 and immediately below the mold-closing position of the clamping device 1 includes an air or hydraulic reciprocating cylinder 21 vertically moving to lift up and down. The reciprocating cylinder 21 is vertically secured to a lower surface of a bottom member of an open-end recess 22, which is formed by partially depressing a substantial center of the base plate 3 below the clamping device 1. An elevating table 23 is accommodated in the open-end recess 22 to be linked with a top end of a reciprocating piston 24.

Mold halves 25a,25a of a primary blow mold 25 are mounted on the elevating table 23 and closed to define a recess on the upper portion thereof for receiving the neck mold 4. Parting or mating faces of the primary blow mold halves 25a,25a conform to the shape of a cavity used for stretching and blowing the preform 6 supported by the neck mold 4 to a final product 7. The pair of halves 25a,25a are connected with each other via spring members 26 for normally pressing the pair of halves 25a,25a outward to maintain a mold-opening state, and freely opened and closed according to the requirements. The mating faces of the primary blow mold halves 25a,25a are combined to define, on their upper ends, a recess for receiving the neck mold 4.

Means applied for maintaining the mold-opening state of the primary blow mold halves 25a,25a is not limited to the spring members 26, but another known means, for example, an air cylinder or a hydraulic cylinder, may be applied in place of the spring members 26.

The primary blow mold 25 is slidably disposed on the upper face of the elevating table 23, while the respective lower ends of the halves 25a,25a are fitted inside a pair of guide projects 27 protruded from both ends of the elevating table 23 in the direction along the tie bars 11,11. The sliding movement opens and closes the primary blow mold 25 in the same direction as the movable platens 15,15 of the clamping device 1.

A bottom mold 28 for defining a bottom of the final product 7 is secured to the substantial center of the elevating table 23. The parting or mating faces of the primary blow mold halves 25a,25a are combined to define, on their lower ends, an engagement recess 29 for receiving the bottom mold 28.

Above the clamping device 1, a horizontally movable transfer platen 8 is supported by and disposed below a vertically movable support member 9, whereas the neck mold 4 is attached below the transfer platen 8 to freely open and close in the horizontal direction. A blow core 10 having a stretch rod 10a is arranged above the support member 9 to be vertically movable to lift up and down. The transfer platen 8 is moved in the horizontal direction until the neck mold 4 is positioned above the parting line of the mold halves in the clamping device 1. The transfer platen 8 is stopped when the neck mold 4 is positioned above the parting line and then lifted down with the support member 9 and the blow core 10 to set the parison 5 supported by the neck mold 4 between the halves 25a,25a of the primary blow mold 25. This structure is known as disclosed in, for example, Japanese Patent Laid-Open Publication No. 60-244518.

A typical molding process with the composite molding device of the first embodiment is described according to the drawings of FIGS. 1 through 6.

While the preform mold 16 is in its open state as shown in FIG. 1, the parison 5 held by the neck mold 4 and transferred by the transfer platen 8 in the horizontal direction to a specified position is lifted down with the neck mold 4 in response to a descending movement of the support member 9 with the transfer platen 8, so as to be set above the parting line of the preform mold 16. The clamping cylinders 13,13 are then activated to expand the clamping pistons 14,14 and close the halves 16a,16a of the preform mold 16.

Figure 3:
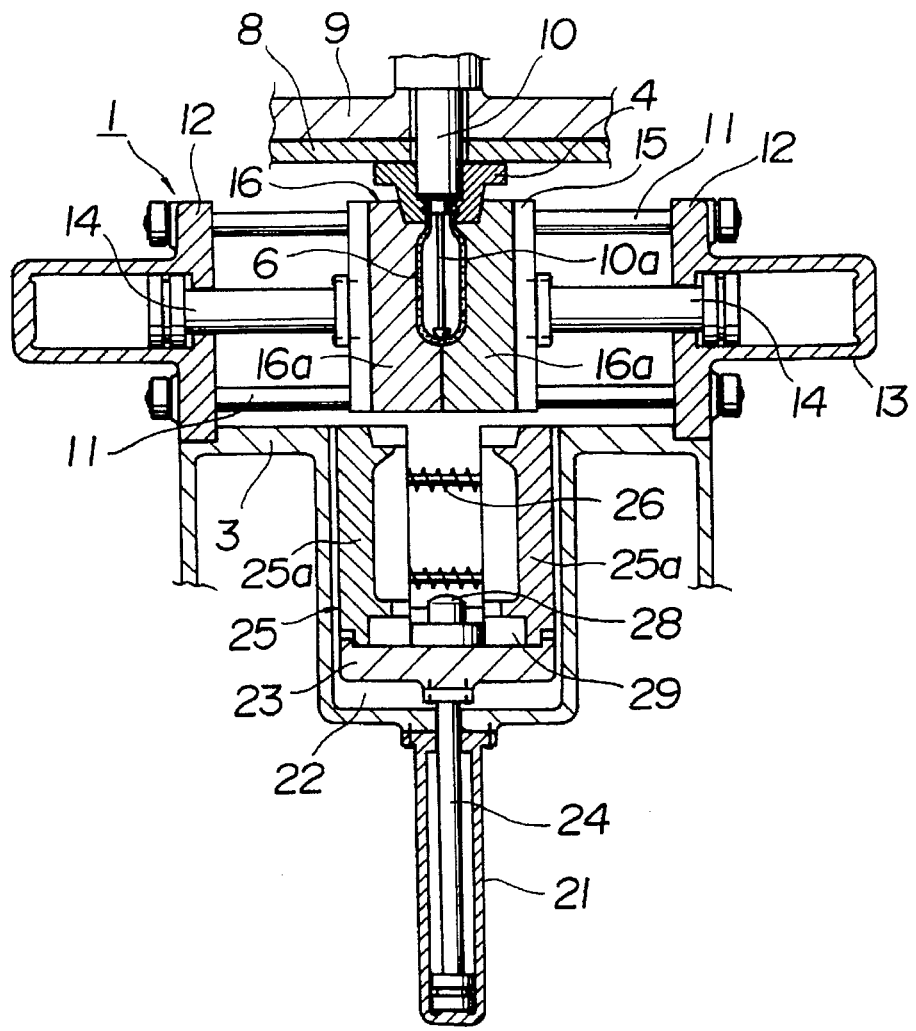
FIG. 3 is a vertical cross sectional view illustrating the composite molding device of the first embodiment in the process of preforming.

At the closed position of the preform mold 16, the neck mold 4 is received by the recess defined on the upper end of the preform mold 16, so that the parison 5 is positioned on the substantial center of the cavity as shown in FIG. 3. The blow core 10 waiting above the support member 9 is then lifted down to be fitted in the neck mold 4. After the preform mold 16 is closed and clamped, the parison 5 is stretched by the stretch rod 10a in the axial direction and expanded with air blow to form the preform 6. The temperature of the parison 5 may be controlled through contact with the cavity surfaces according to the requirements. For that purpose, a desired heat medium is arranged through the halves 16a,16a of the preform mold 16.

Thermal insulators (not shown) are applied on the respective rear faces of the halves 25a,25a of the primary blow mold 25, in order to prevent the halves 25a,25a from being heated by the temperature-controlling heat medium through contact with the halves 16a,16a of the preform mold 16.

Figure 4:
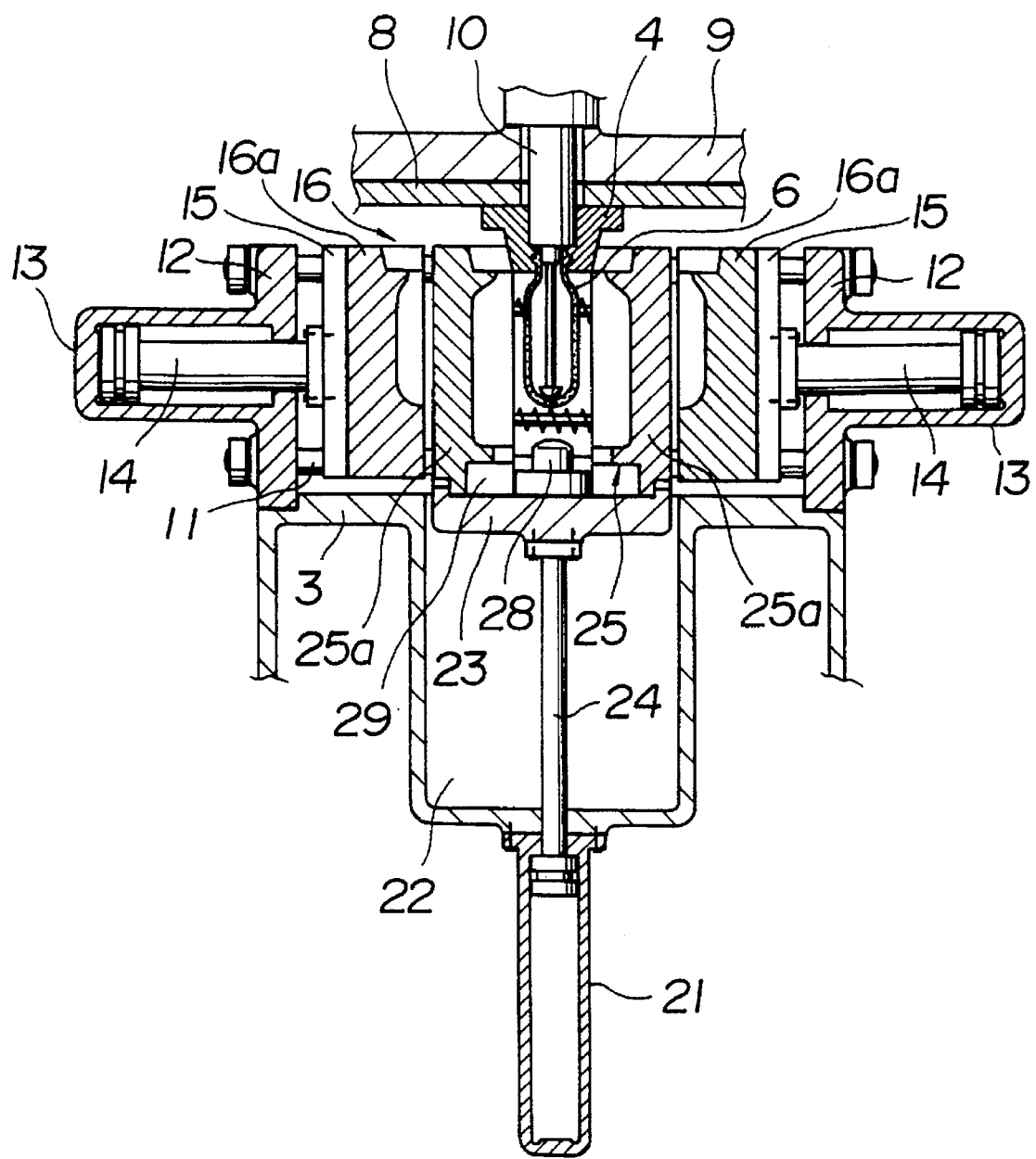
FIG. 4 is a vertical cross sectional view illustrating the composite molding device of the first embodiment, where the halves of primary blow mold are positioned between the halves of preform mold.

Referring to FIG. 4, the clamping cylinders 13,13 are activated to open the preform mold 16 after conclusion of the preforming process. This mold-opening step returns the halves 16a,16a of the preform mold 16 to their original, opening positions while the preform 6 held by the neck mold 4 remains on the parting line. The reciprocating cylinder 21 is then driven to ascend the reciprocating piston 24 and thereby lift the elevating table 23 up to the surface of the base plate 3. The lift-up movement of the elevating table 23 allows the primary blow mold 25 normally pressed outward by means of the spring pressure to be kept in the open state is positioned between the halves 16a,16a of the preform mold 16.

Figure 5:
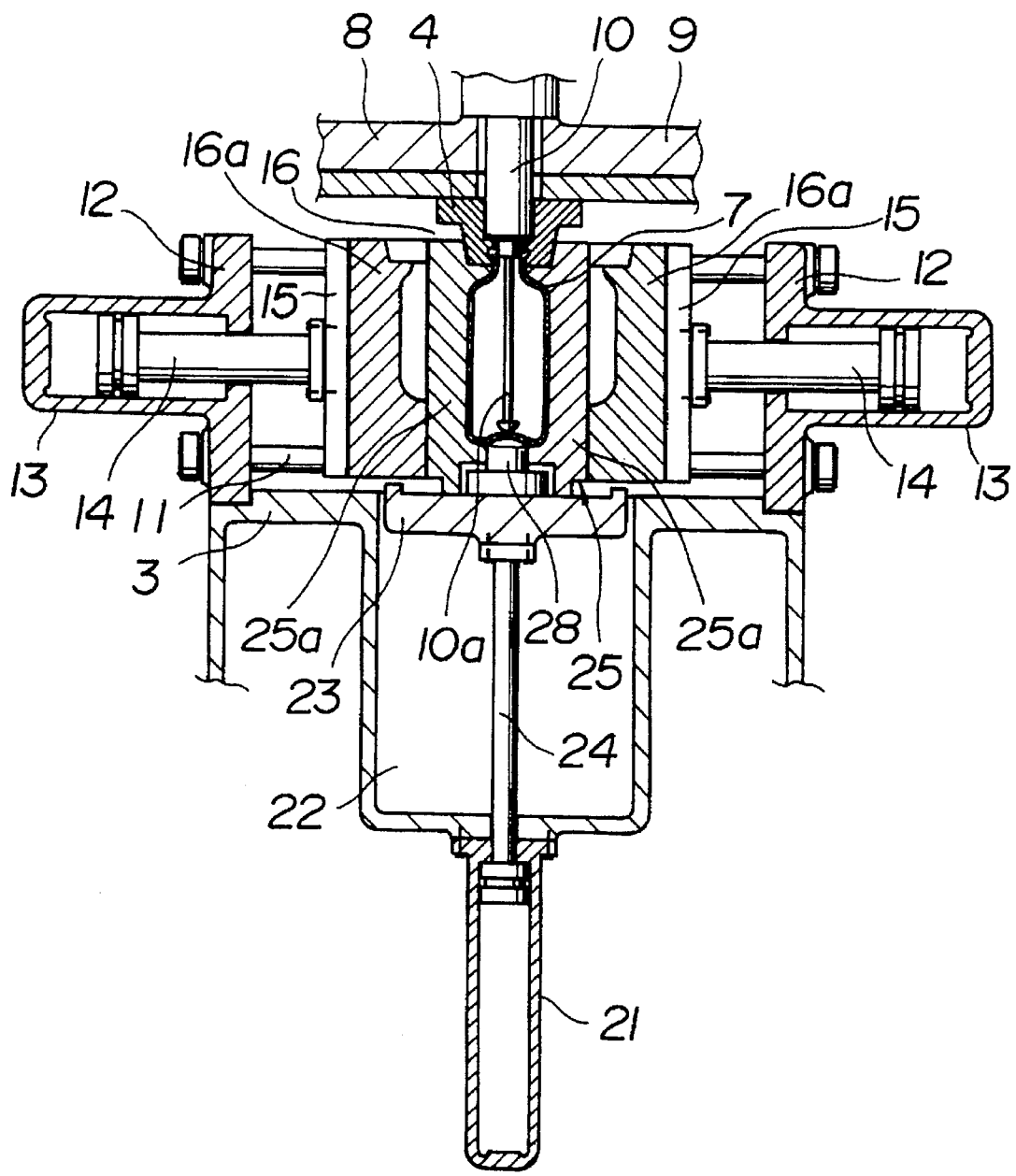
FIG. 5 is a vertical cross sectional view illustrating the composite molding device of the first embodiment in the process of primary blow molding.

After the primary blow mold 25 is ascended to the lift-up position, the clamping cylinders 13,13 are activated again to expand the clamping pistons 14,14 and shift the halves 16a,16a of the preform mold 16 in the closing direction. The respective parting faces of the halves 16a,16a come into contact with and press against the outside faces of the halves 25a,25a of the primary blow mold 25 as shown in FIG. 5. The halves 25a,25a are pressed and closed to define the primary blow cavity, while the preform 6 is positioned on the substantial center of the cavity.

While the clamping cylinders 13,13 are activated to close the primary blow mold 25 via the preform mold 16, the preform 6 is further stretched by the stretch rod 10a in the axial direction and expanded with air blow to fill the cavity and form the final product 7.

Figure 6:
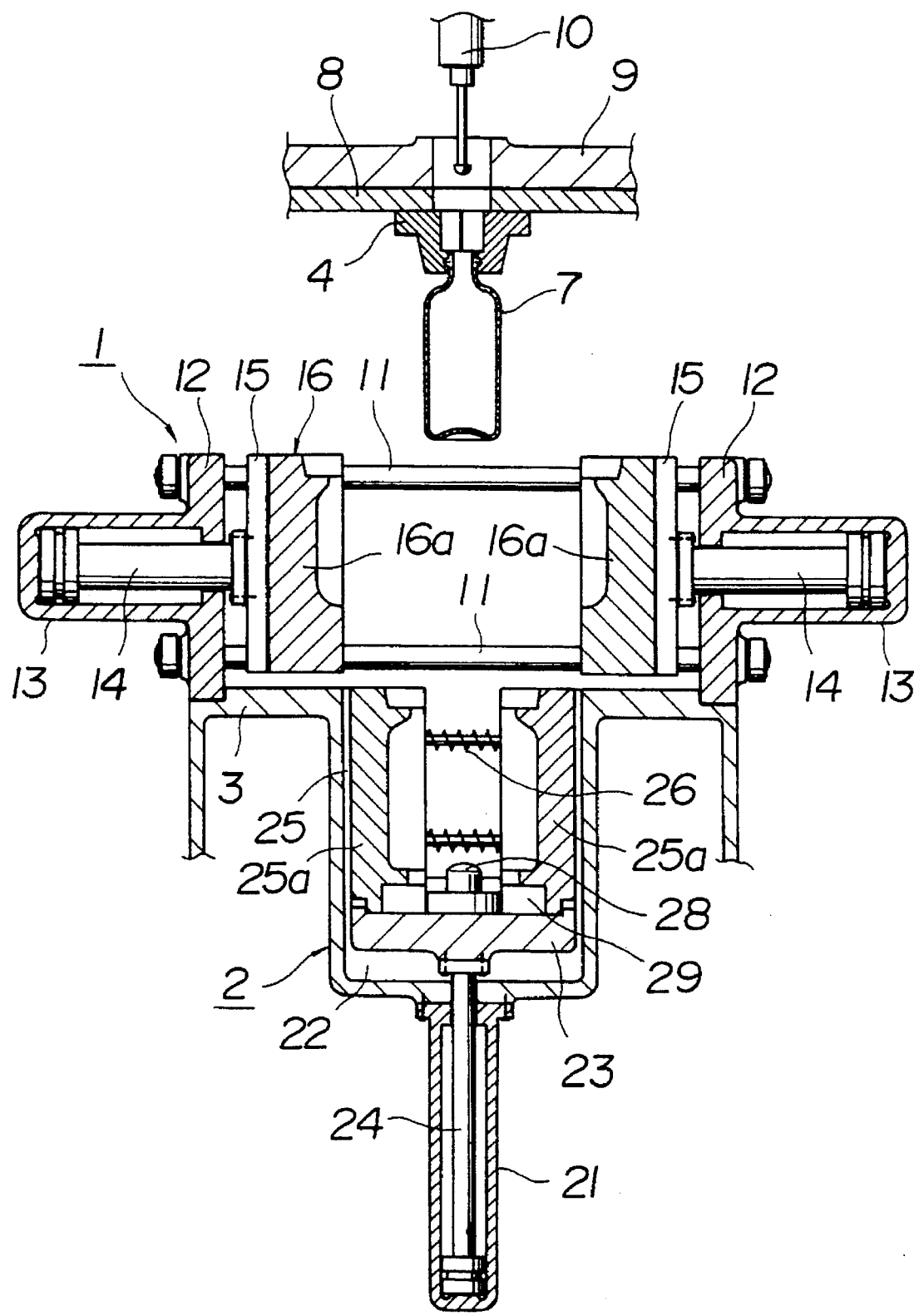
FIG. 6 is a vertical cross sectional view illustrating the composite molding device of the first embodiment in an open state after conclusion of the primary blow molding process.
Figure 7:
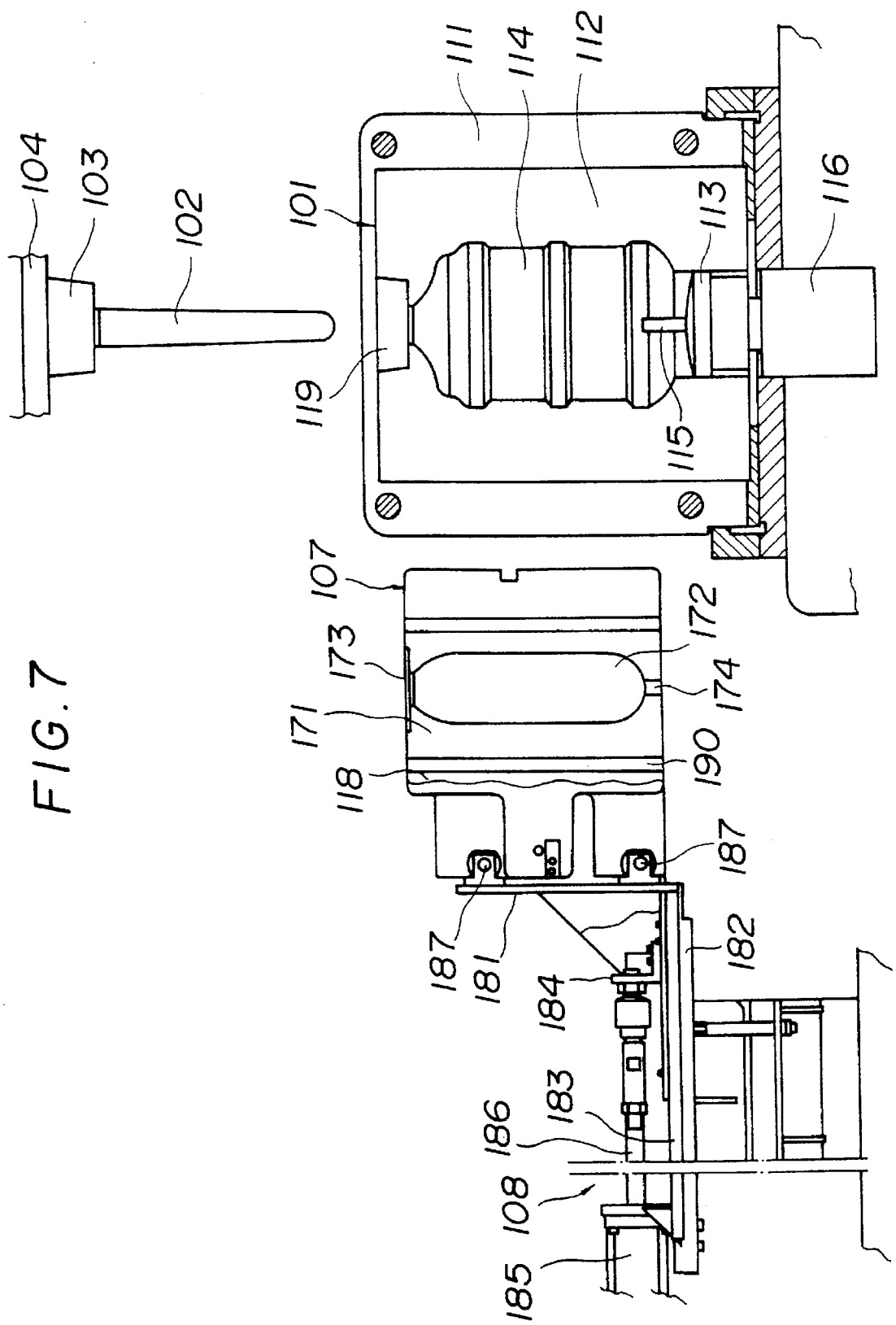
FIG. 7 is a partially cross-sectional, front view illustrating a composite molding device, in an open state, applied for stretch blow molding large articles, as a second embodiment according to the present invention.

Referring to FIG. 6, after conclusion of the stretch blow molding, the clamping cylinders 13,13 are activated again to eliminate the mold-closing force applied to the primary blow mold 25 and contract the clamping pistons 14,14 to open the preform mold 16, so that the halves 25a,25a of the primary blow mold 25 are returned to their original, opening positions by means of the spring pressure. The reciprocating cylinder 21 is subsequently driven to lower the elevating table 23 and thereby lift the halves 25a,25a of the primary blow mold 25 in the open state down to their original positions. The primary blow mold 25 in its lift-down position is accommodated in the base plate 3 and waits for another operation.

While the halves 25a,25a of the primary blow mold 25 are returned to their original positions, the final product 7 held by the neck mold 4 remains above the parting line or at the molding position. The support member 9 with the transfer platen 8 is subsequently lifted as shown in FIG. 6 up to the original position shown in FIG. 1, so that the final product 7 is positioned above the composite molding device and transferred to a subsequent product release station.

In the composite molding device including the preform mold 16 and the primary blow mold 25 arranged in three dimensions, the primary blow mold 25 is moved in the vertical direction. This structure does not require any additional space for shifting the primary blow mold 25 on the base plate 3 nor increases the required area of the base plate 3, thereby preventing the whole molding machine requiring the preforming or temperature control process from becoming undesirably bulky.

The clamping device 1 is secured to the base plate 3, while the preform mold 16 is replaced by the primary blow mold 25 or vice versa in the clamping device 1. Compared with the conventional structure of horizontally moving both the preform mold and the primary blow mold with the clamping device for replacement, the structure of lifting up and down the primary blow mold 25 for the replacement is free from danger and decreases the shifting mass. Even when a long side-to-side, multi-cavity mold is used for mass producing final articles, the multi-cavity mold is shifted in the vertical direction not to increase the moving distance proportional to its length. This structure decreases the moving distance of the multi-cavity mold in the horizontal direction, thereby saving the time required for the replacement. A relatively small-sized elevating mechanism sufficiently works for replacing one mold by another, thus realizing the easy and secure maintenance.

FIGS. 7 through 12 show a molding machine applied for stretch blow molding large articles, such as 20-l bottles, as a second embodiment according to the invention.

In this second embodiment, a primary blow mold 101 is disposed on the side of a clamping device (not shown). The primary blow mold 101 includes a pair of movable plates 111,111 linked with clamping pistons (not shown) of the clamping device to be freely movable in the horizontal direction, a pair of mold halves 112,112 disposed inside the movable plates 111,111, and a vertically movable bottom mold 113.

Figure 10:
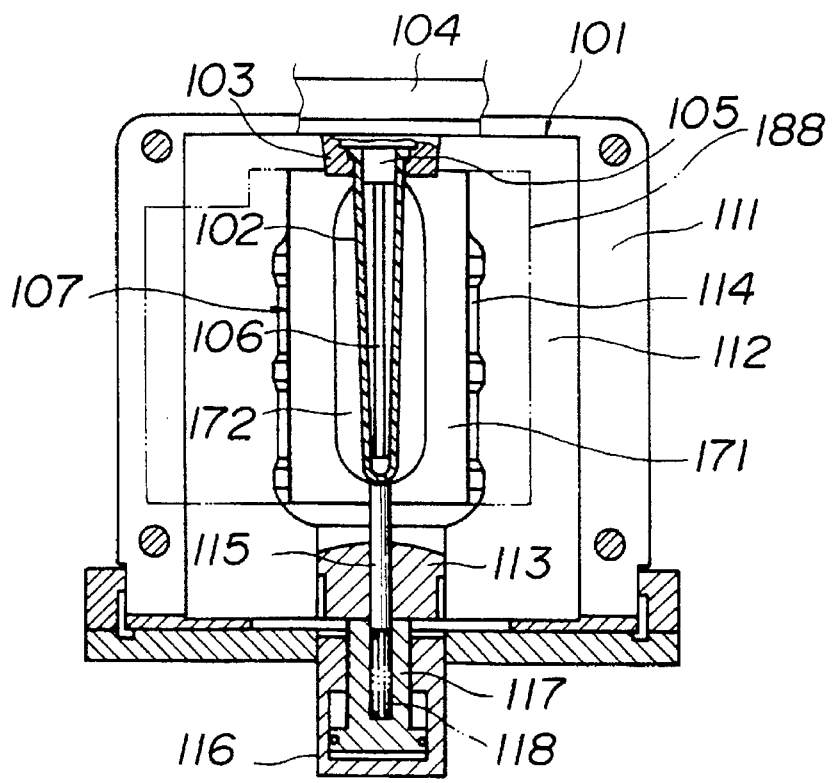
FIG. 10 is a vertical cross sectional view schematically illustrating a process of molding a preform.
Figure 11:
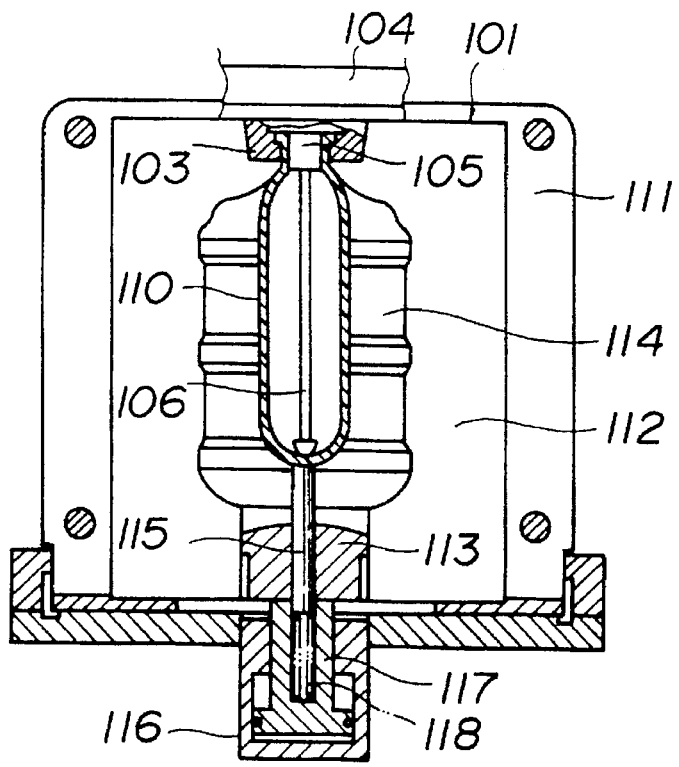
FIG. 11 is a vertical cross sectional view schematically illustrating the primary blow mold after the preform mold is removed.
Figure 12:
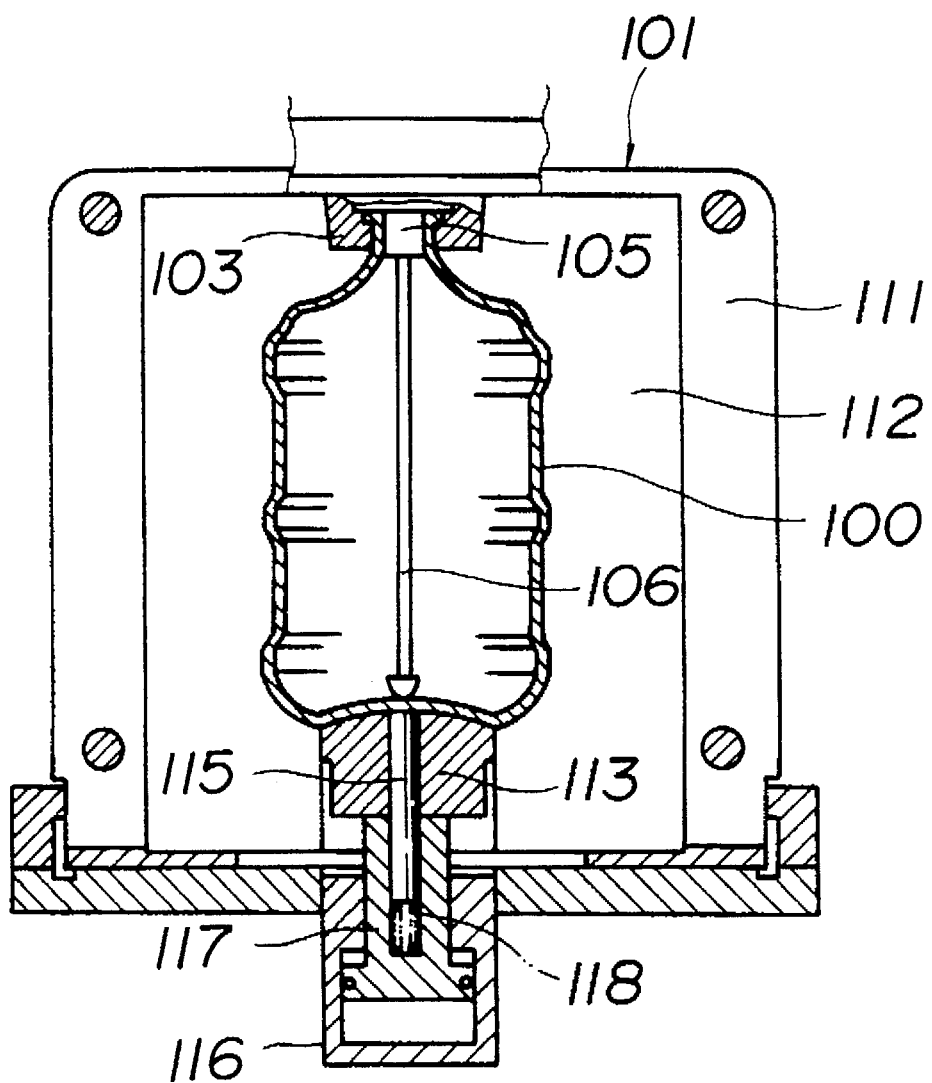
FIG. 12 is a vertical cross sectional view schematically illustrating a process of molding a large article with the primary blow mold.

The pair of mold halves 112,112 have mating surfaces to conform to the shape of a cavity 114 of a resulting large article. The mold halves 112,112 are combined to define, on their upper end, a receptacle 119 for receiving a lip die 103. A support rod 115 for a preform (described later) is projected from the substantial center of the bottom mold 113 in such a manner as to allow vertical movements of the support rod 115 for protrusion and withdrawal. The support rod 115 is held by a spring member 118 incorporated in a plunger 117 of an elevating mechanism 116 as shown in FIGS. 10 through 12.

A closed-end parison 102 prepared by the process of injection molding is shifted to be positioned above the primary blow mold 101 while the neck of the closed-end parison 102 is held by the lip die 103. A preform mold 107 used for preforming the closed-end parison 102 is attached to a movable plate 181 of a horizontally reciprocating unit 108 placed on a table 182 on the side of the primary blow mold 101. The movable plate 181 is disposed upright on a front end of a movable bottom plate 183, which is guided by a guide rail on the table 182 for advance and retreat. The movable plate 181 is linked with an end of a movable rod 186 of a hydraulic driving unit 185 via a member 184 on the movable bottom plate 183. Support shafts 187,187 are horizontally extended over upper and lower ends of movable plate 181. A pair of upright support plates 188,188 are movably supported by both ends of the support shafts 187, and normally pressed outward by a spring member 189 spanning across the space between the support plates 188, 188 and in the vicinity of the support shafts 187.

Frames 190,190 are further arranged inside the pair of support plates 188,188. Mold halves 171,171 of the preform mold 107 are fitted in the frames 190,190, where a pair of thermal insulators 191,191 are positioned between the mold halves 171,171 and the pair of support plates 188,188.

The pair of mold halves 171,171 have mating surfaces to conform to the shape of a cavity 172. The mold halves 171,171 are combined to define, on their upper end, a receptacle 173 for receiving the lip die 103, where the receptacle 173 is placed at the same height as the receptacle 119 of the primary blow mold 101. An aperture 174, in which the support rod 115 is inserted and fitted, is formed on the bottom center of the mold halves 171,171.

Figure 8:
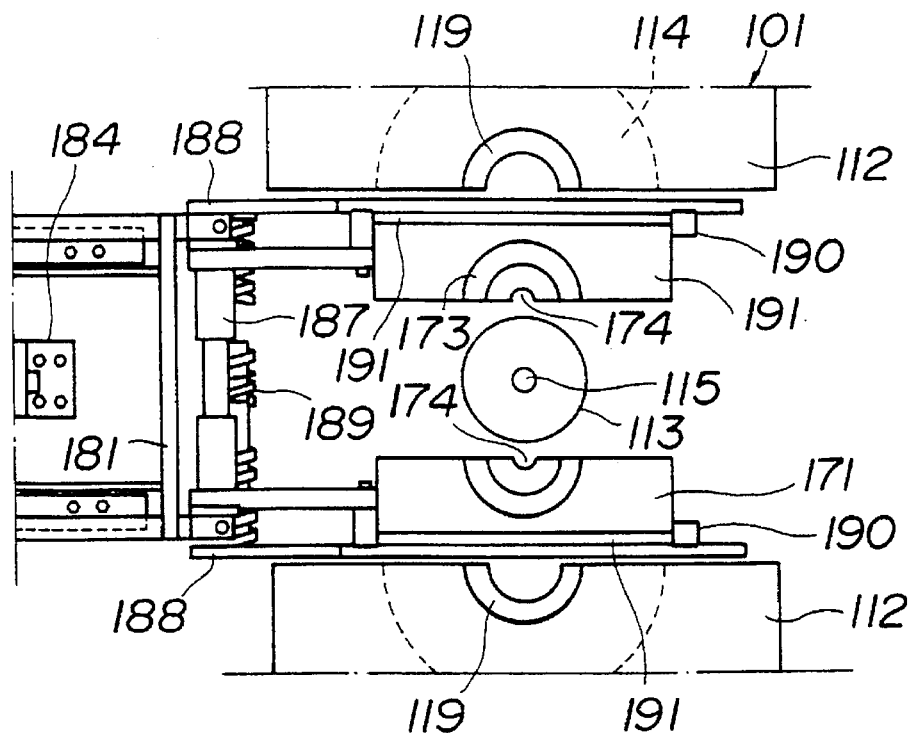
FIG. 8 is a plan view illustrating essentials of the composite molding device of the second embodiment, where the halves of preform mold are positioned between the halves of primary blow mold.

The mold halves 171,171 of the preform mold 107 are shifted horizontally in their opening state with the pair of support plates 188,188 by the advance operation of the hydraulic driving unit 185, and inserted into the space between the mold halves 112,112 of the primary blow mold 101 in their opening state. The mold halves 171,171 of the preform mold 107 may be inserted between the mold halves 112,112 of the primary blow mold 101 after or before the closed-end parison 102 shifted horizontally is lifted down with the transfer platen 104 to be positioned on the substantial center of the opened, mold halves 112,112. The closed-end parison 102 is accordingly set on the substantial center of the mold halves 171,171 of the preform mold 107 as shown in FIG. 8.

Figure 9:
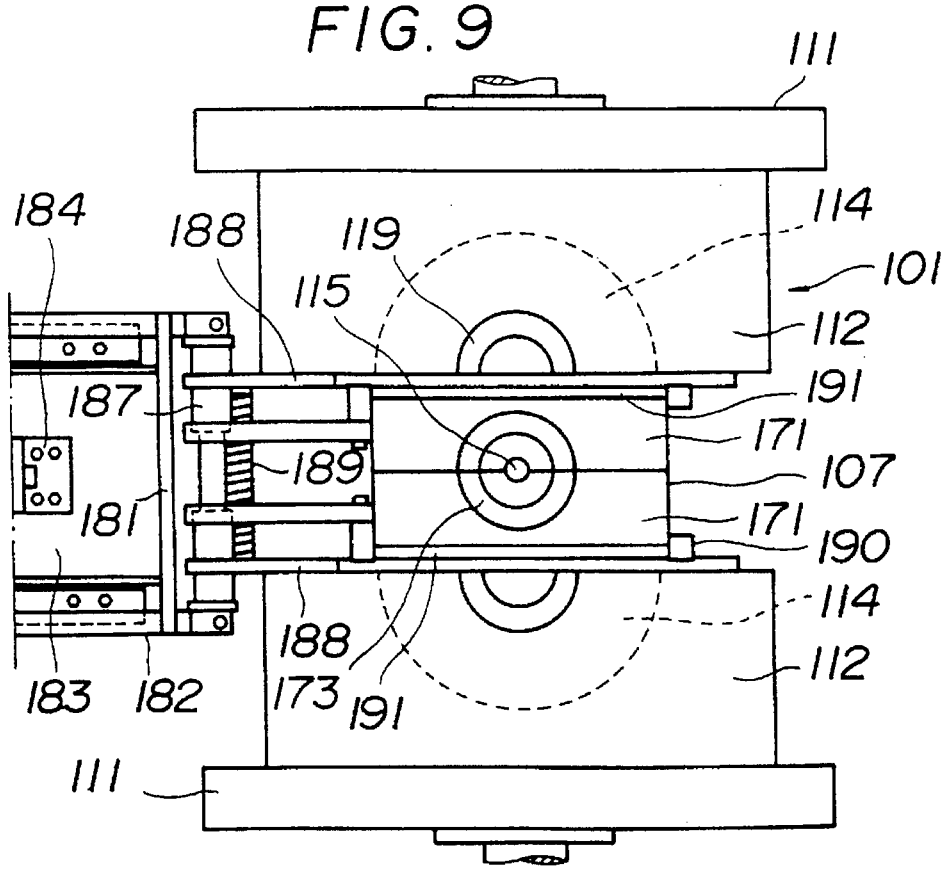
FIG. 9 is a plan view illustrating the essentials of the composite molding device of the second embodiment, where the halves of preform mold are in a closed state.

The primary blow mold 101 is temporarily closed and a pressure is applied to the mold halves 171,171 of the preform mold 107 and the support plates 188,188 via the mold halves 112,112 of the primary blow mold 101. This closes the preform mold 107, in which the closed-end parison 102 is set, as shown in FIG. 9. The mold-closing operation defines the cavity 172 for preparing a preform 110 and allows the support rod 115 projected from the bottom mold 113 to be received by the aperture 174 formed on the bottom of the preform mold 107.

After the mold-closing operation, a blow core 105 and a stretch rod 106 passing through the transfer platen 104 are inserted downward into the lip die 103 received by the receptacle 119 on the upper end of the primary blow mold 101. Pressure is again applied via the primary blow mold 101 to close and clamp the preform mold 107.

After the preform mold 7 is closed, the stretch rod 106 is pierced into the blow core 105 to be extended in the axial direction as shown in FIG. 10, so that the closed-end parison 102 is stretched by the stretch rod 106 and blow-molded by the air pressure blown through the blow core 105. The stretching process allows the bottom of the closed-end parison 102 to be held between the stretch rod 106 and the support rod 115, whereas the air pressure allows the closed-end parison 102 to be expanded and fill up the cavity 172, so as to give the preform 110. After the completed molding of the preform 10, the primary blow mold 101 is opened to release the pressing force against the preform mold 7. The mold halves 171,171 of the preform mold 107 are automatically opened by the restoring force of the compressed spring member 189, while the preform 110 remains on the center of the mold halves 171,171.

When the mold halves 112,112 of the primary blow mold 101 are completely apart from the support plates 188,188, the reciprocating unit 108 is activated to retreat the preform mold 107. This allows the preform 110 to be supported by the support rod 115 and positioned on the substantial center of the primary blow mold 101 as shown in FIG. 11.

The primary blow mold 101 is closed and clamped again. The preform 110 is further stretched in the axial direction by the stretch rod 106 and expanded by the air pressure, simultaneously with or prior to blow molding the bottom of the preform 110 with the ascended bottom mold 113. The lift-up movement of the bottom mold 113 allows the support rod 115 to be accommodated in the bottom mold 113 against the force of the spring member 118 and gives a thin-walled, large article 100 shown in FIG. 12 as a final product. The large article 100 is removed from the primary blow mold 101 after a known mold-releasing operation.

The above embodiments are only illustrative and not restrictive in any sense. There may be many modifications, alterations, and changes without departing from the scope or spirit of essential characteristics of the invention. The scope and spirit of the present invention are limited only by the terms of the appended claims.

What is claimed is:

1. A composite molding device for stretch blow molding, said composite molding device comprising:

a clamping device including a pair of stationary platens, a pair of clamping cylinders, and a pair of movable platens, said pair of stationary platens being interconnected by a plurality of tie bars and arranged upright and in parallel on a base plate, said pair of clamping cylinders being disposed outside said pair of stationary platens for receiving a pair of clamping pistons, respective ends of said clamping pistons running through and being projected inward from the corresponding stationary platens, said pair of movable platens being arranged between said pair of stationary platens and supported by said tie bars to be movable in a predetermined direction, said movable platens being linked with the respective ends of said clamping pistons;

a pair of first mold halves respectively attached to opposed faces of said movable platens in said clamping device to be movable in said predetermined direction between a mold-opening position and a mold-closing position; and a pair of second mold halves arranged to move between an advance position, where said pair of second mold halves are placed between said pair of first mold halves in said clamping device, and a retreat position, said pair of second mold halves being pressed against and supported by movable members of an air or hydraulic reciprocating unit to have a parting line identical with a parting line of said pair of first mold halves in said clamping device, said pair of second mold halves being normally pressed to a mold-opening position, when said pair of second mold halves being placed between said pair of first mold halves arranged at said mold-opening position in said clamping device, pressure of said clamping device being transmitted via said pair of first mold halves to said pair of second mold halves so as to close and clamp said pair of second mold halves.

2. A composite molding device claimed in claim 1, wherein one pair out of said pair of first mold halves and said pair of second mold halves comprises halves of preform mold having mating faces to confront to shape of a first cavity applied for molding a parison to a preform or controlling temperature of said parison, and the other pair comprises a bottom mold and halves of primary blow mold having mating faces to confront to shape of a second cavity applied for molding said preform to a final product, said halves of preform mold being combined to define a first recess on an upper end of said first cavity, said first recess receiving a neck mold, which functions as a parison holder and is arranged below a horizontally and vertically movable transfer platen positioned above said clamping device, so as to allow horizontal movement of said neck mold between an opening position and a closing position, said halves of primary blow mold being combined to define a second recess on an upper end of said second cavity, said second recess having a cross section identical with that of said first recess.

3. A composite molding device claimed in claim 1, wherein said reciprocating unit for moving said pair of second mold halves further comprises:

a reciprocating cylinder vertically secured in said base plate and immediately below said mold-closing position of said pair of first mold halves in said clamping device, said reciprocating cylinder receiving a reciprocating piston;

an elevating table linked with a top end of said reciprocating piston, said pair of second mold halves being mounted on said elevating table to be movable in said predetermined direction, in which said pair of movable platens move; and an elevating mechanism for vertically moving said pair of second mold halves mounted on said elevating table between a mold-opening position and a mold-closing position.

4. A composite molding device claimed in claim 3, wherein said cylinder is fixed to a bottom member of a recess formed in said base plate, said elevating mechanism moving said pair of second mold halves with said elevating table arranged on the top end of said piston to lift up and down said pair of second mold halves in said recess.

5. A composite molding device claimed in claim 1, wherein said reciprocating unit for moving said pair of second mold halves further comprises:

a base arranged just beside said mold-closing position of said pair of first mold halves in said clamping device;

a movable member mounted on said base to approach to and separate from said pair of first mold halves in said clamping device; and a pair of support plates movably supported by both ends of a support shaft spanning across one end of said movable member and normally pressed outward by a spring member, said pair of second mold halves being attached respectively inside said pair of support plates.

6. A composite molding device claimed in claim 1, wherein said pair of first mold halves in said clamping device comprise a preform mold, and said pair of second mold halves comprise a primary blow mold, said primary blow mold being closed and clamped via said preform mold.

7. A composite molding device claimed in any one of claims claim 1, wherein said pair of first mold halves in said clamping device comprise a primary blow mold, and said pair of second mold halves comprise a preform mold, said preform mold being closed and clamped via said primary blow mold.

* * * * *